(12) United States Patent
Kage et al.

(10) Patent No.: US 6,411,278 B1
(45) Date of Patent: Jun. 25, 2002

(54) COORDINATED POSITION CONTROL SYSTEM, COORDINATE POSITION CONTROL METHOD, AND COMPUTER-READABLE STORAGE MEDIUM CONTAINING A COMPUTER PROGRAM FOR COORDINATE POSITION CONTROLLING RECORDED THEREON

(75) Inventors: Hiroshi Kage; Eiichi Funatsu, both of Tokyo; Tetsuji Aoyagi, Yokohama; Hajime Suzuki, Sagamihara, all of (JP)

(73) Assignees: Mitsubishi Denki Kabushiki Kaisha, Tokyo; Digital Stream Corporation, Kanagawa, both of (JP)

( * ) Notice: Subject to any disclaimer, the term of this patent is extended or adjusted under 35 U.S.C. 154(b) by 0 days.

(21) Appl. No.: 09/347,194

(22) Filed: Jul. 2, 1999

(30) Foreign Application Priority Data

Mar. 19, 1999 (JP) .......................................... 11-074996

(51) Int. Cl.$^7$ ................................................ G09G 5/08
(52) U.S. Cl. ...................... 345/158; 345/157; 178/18.01
(58) Field of Search ................................ 345/156, 157, 345/158, 159, 160, 161–179, 863, 850–851, 848; 178/4.1 R, 15, 18.09, 18.1, 18.01, 18.02–18.07

(56) References Cited

U.S. PATENT DOCUMENTS

| | | | | |
|---|---|---|---|---|
| 5,394,183 A | * | 2/1995 | Hyslop | 348/88 |
| 5,418,862 A | * | 5/1995 | Zheng et al. | 382/199 |
| 5,515,079 A | * | 5/1996 | Hauck | 345/157 |
| 5,528,263 A | * | 6/1996 | Platzker et al. | 345/156 |
| 5,712,474 A | * | 1/1998 | Naneda | 250/208.1 |
| 5,786,804 A | | 7/1998 | Gordon | 345/158 |
| 5,835,078 A | * | 11/1998 | Arita et al. | 345/158 |
| 5,835,641 A | * | 11/1998 | Sotoda et al. | 382/291 |
| 5,973,672 A | * | 10/1999 | Rice et al. | 345/158 |
| 6,050,690 A | * | 4/2000 | Shaffer et al. | 353/122 |
| 6,144,366 A | * | 11/2000 | Numazaki et al. | 345/156 |

FOREIGN PATENT DOCUMENTS

| | | |
|---|---|---|
| JP | 4241077 | 8/1992 |
| JP | 9134250 | 5/1997 |

* cited by examiner

*Primary Examiner*—Vijay Shankar
*Assistant Examiner*—Mansour M. Said
(74) *Attorney, Agent, or Firm*—Leydig, Voit & Mayer, Ltd.

(57) ABSTRACT

When an operator operates a pointing device, a direction computing section computes a movement vector from an image photographed by an image sensor, and when the movement vector is larger than a threshold, a direction correcting section determines the movement vector as invalid based on the recognition that the movement vector was caused by an abrupt change in the illumination or other conditions, and outputs only movement vectors that are smaller than the threshold to a coordinate position updating section.

8 Claims, 11 Drawing Sheets

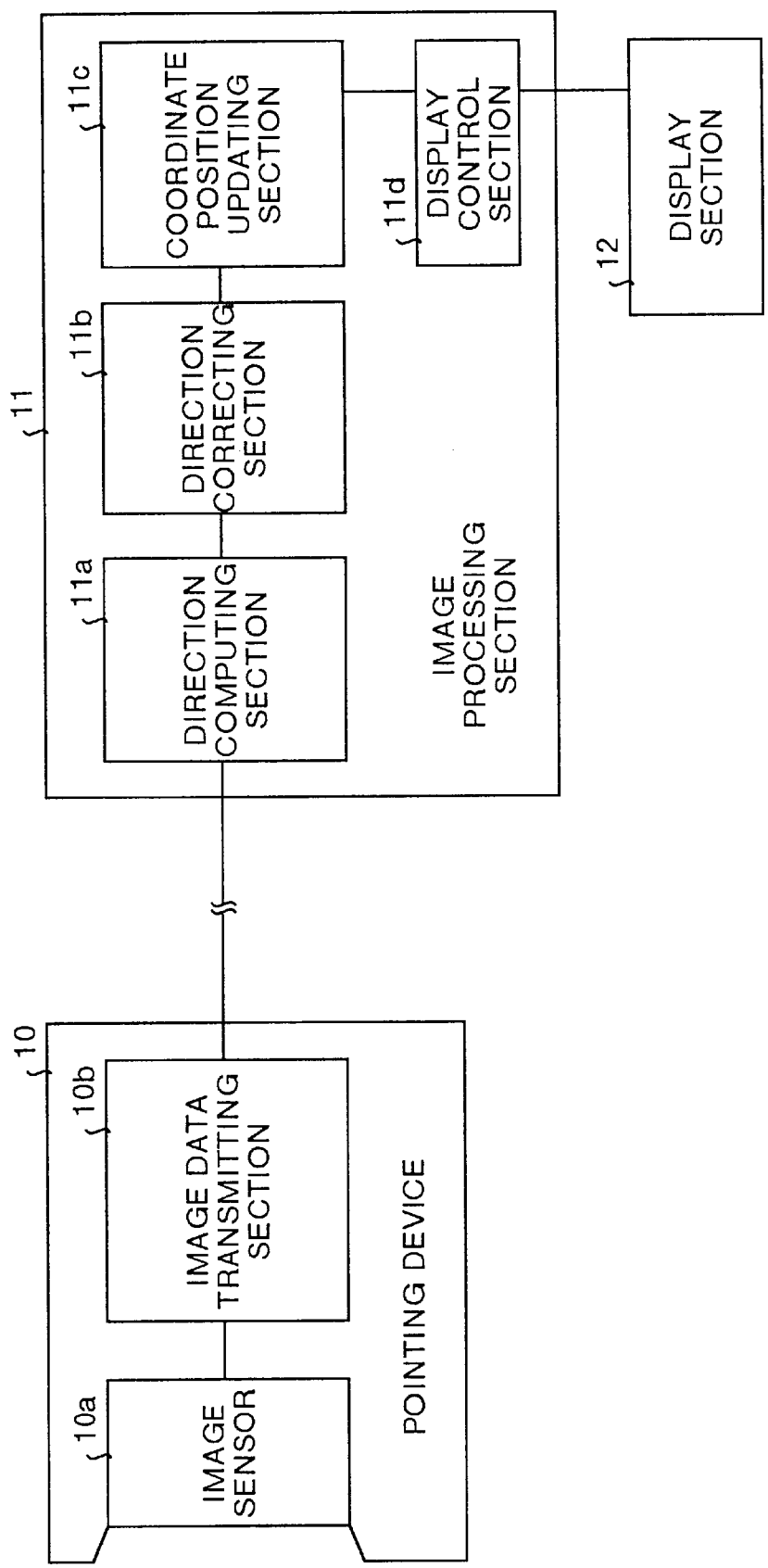

COORDINATED POSITION CONTROL SYSTEM, COORDINATE POSITION CONTROL METHOD, AND COMPUTER-READABLE STORAGE MEDIUM CONTAINING A COMPUTER PROGRAM FOR COORDINATE POSITION CONTROLLING RECORDED THEREON

FIELD OF THE INVENTION

The present invention relates to a coordination position control system for updating a coordinate position of a cursor or an icon displayed on a screen or a display unit from a movement vector computed using an image captured with an image sensor, a coordinate position control method, and a computer-readable storage medium containing a program for coordinate position controlling recorded thereon.

BACKGROUND OF THE INVENTION

A mouse has been widely used as a pointing device used in information terminal equipment such as a personal computer, and especially a mechanical mouse with a ball provided therein for two-dimensionally moving and controlling a mouse cursor in response to rotation of the ball is used most popularly.

With the conventional type of mechanical mouse as described above, as a cursor can be moved only two-dimensionally, and to overcome this limitation, recently there has been developed and put into practical used the coordinate position control technology enabling three-dimensional movement of a cursor by providing an image sensor within a pointing device and using a movement vector of an image photographed with this image sensor.

For instance, the technology for controlling a cursor position on a video display by computing correlation of movement vectors included in an image consisting of 32×32 pixels is disclosed in Japanese Patent Laid-Open Publication No. HEI 9-134250. Japanese Patent Laid-Open Publication No. HEI 4-241077 discloses the technology for computing a movement vector not by computing correlation between movement vectors, but by using an optical flow.

With the conventional technology, a cursor can three-dimensionally be moved and controlled by computing a movement vector by means of correctional computing from an image captured with an image sensor or an optical flow and according to the movement vector.

However, when it is tried to update a cursor position by using a movement vector computed from an image photographed with an image sensor based on the conventional technology as described above, for instance, when the illuminating conditions change rapidly, sometimes a trajectory actually drawn by a cursor may be different from that intended by a user.

In other words, when illuminating conditions within an area covered by the image sensor change rapidly, the computed a movement vector becomes extremely large, as compared to that computed immediately before, and consequently, a trajectory drawn with a cursor is offset from an intended one.

Further, when a user moves a pointing device extremely slowly, each component of a computed movement vector, which should be an integer number, may be a value less than 1, and consequently sometimes a cursor position is not correctly updated according to a movement vector and the cursor is disadvantageously stopped.

For the reasons as described above, how to efficiently solve such problems as offset of a cursor trajectory due to an abrupt change in illuminating conditions and stopping of a cursor position when moved very slowly, when updating a cursor position according to a movement vector computed from an image, are extremely important problems.

SUMMARY OF THE INVENTION

It is an object of the present invention to provide a coordinate position control system capable of smoothly and flexibly shifting a coordinate position of a cursor, when controlling a coordinate position of a displayed matter such as a cursor by using a movement vector of an image photographed with an image sensor or the like, even if the illuminating conditions change rapidly, or even if a cursor is moved at a low speed, a coordinate position control method and a computer-readable storage medium containing a program for coordinate position controlling recorded thereon.

With the present invention, a movement vector from an image photographed with an image capturing section in a coordinate position instructing device is computed, the computed movement vector is compared with a specified threshold value, validity of the movement vector is determined according to a result of this comparison, and an instructed coordinate position in response to an operation of the coordinate system instructing position is smoothly updated according to the movement vector determined as valid.

With the present invention, a size of a computed movement vector is compared with a prespecified threshold value, and when the size of the movement vector is larger than the prespecified threshold value the movement vector is determined as invalid, so that a coordinate position can be controlled by excluding a movement vector which changes rapidly due to a change in the illuminating conditions.

With the present invention, a size of the computed movement vector is compared with a prespecified threshold value, and when the size of the movement vector is smaller than the prespecified threshold value the movement vector is determined as invalid, so that a coordinate position can be controlled by excluding a movement vector which change minutely due to a change in the illuminating conditions.

With the present invention, an accumulated vector is computed by successively adding the movement vectors which are smaller than a prespecified threshold value, and when the accumulated vector exceeds the prespecified threshold value this accumulated vector is determined as valid, so that movement vectors when a photographed image changes at a low speed can be summed up into one accumulated movement vector.

With the present invention, an accumulated movement vector can be attenuated in response to passage of a specified period of time according to a prespecified attenuation coefficient, so that fluctuation of a cursor position generated when noises in movement vectors under unstable illuminating conditions are accumulated can be attenuated.

With the present invention, an angle between a movement vector as an object to be determined and a movement vector determined as valid immediately before is compared with a specified angular range, and when the angle between the two vectors is not within the specified angular range the movement vector is determined as invalid, so that a movement vector whose angle changes rapidly can be excluded.

With the present invention, a movement vector from an image captured with an image capturing section of a coordinate position instructing device is computed, the computed movement vector is compared with a prespecified threshold value, validity of the movement vector is determined according to a result of this comparison, and an instructed coordinated position in response to an operation of the coordinate position instructing device is updated according to the movement vector determined as valid, so that an instructed coordinated position can smoothly be updated.

With the present invention, a size of a computed movement vector is compared with a prespecified threshold value, and when the size of the movement vector is larger than the prespecified threshold value the movement value is determined as invalid, so that a movement vector which changes rapidly due to a change in the illuminating conditions can be excluded.

With the present invention, a size of a computed movement vector is compared with a prespecified threshold value, and when the size of the movement vector is smaller than the prespecified threshold value the movement vector is determined as invalid, so that a movement vector which changes minutely due to a change in the illuminating conditions can be excluded.

With the present invention, an accumulated movement vector is obtained by successively adding the movement vectors which are smaller than a prespecified threshold value, and when the accumulated vector exceeds the prespecified threshold value the accumulated vector is determined as valid, so that movement vectors of an image which change at a low speed can be summed up into one accumulated vector.

With the present invention, an accumulated vector is attenuated in response to passage of a specified period of time, so that fluctuation of a cursor position generated when noises in movement vectors under unstable illuminating conditions can be attenuated.

With the present invention, an angle between a movement vector as an object to be determined and a movement vector determined as valid immediately before is compared with a prespecified angular range, and when the angle between the two vectors is not within the prespecified angular range the movement vector is determined as invalid, so that a movement vector whose angle changes rapidly can be excluded.

Other objects and features of this invention will become understood from the following description with reference to the accompanying drawings.

BRIEF DESCRIPTION OF THE DRAWINGS

FIG. 1 is a functional block diagram showing system configuration of a coordinate position control system according to Embodiment 1 of the present invention;

DESCRIPTION OF THE PREFERRED INVENTION

Figure 2A:
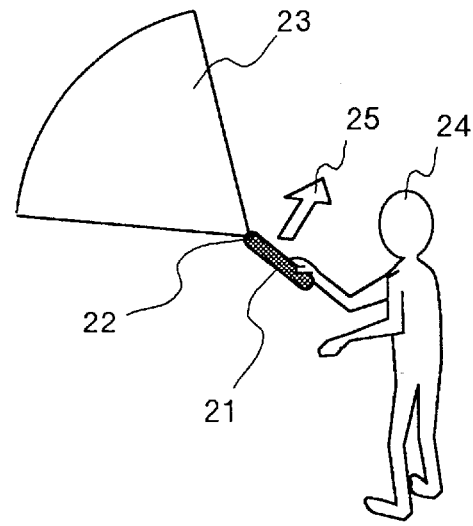
FIGS. 2A and 2B are views showing one example of environment for actual use of the coordinate position control system shown in FIG. 1.

Next detailed description is given by preferred embodiments of a coordinate position control system, a coordinate position control method, and a computer-readable storage medium containing a program for coordinate position controlling recorded thereon according to the present invention.

FIG. 1 is a functional block diagram showing a system configuration of a coordinate position control system according to Embodiment 1 of the present invention. As shown in the figure, this coordinate position control system comprises a pointing device 10, an image processing device 11, and a display section 12. The pointing device 10 has an image sensor 10$a$ for photographing an image, and an image data transmitting section 10$b$ for transmitting image data photographed by this image sensor 10$a$ to the image processing device 11. When a user operates the pointing device 10, images are successively obtained by the image sensor 10$a$ incorporated in the pointing device 10, and the images are transmitted by the image data transmitting section 10$b$ to the image processing device 11 by means of cable communications or radio communications.

The image processing apparatus 11 has a direction computing section 11$a$, a direction correcting section 11$b$, a coordinate position updating section 11$a$, and a display control section 11$d$. When an image is received from the pointing device 10, the direction computing section 11$a$ computes a movement vector from the image, the direction correcting section 11$b$ compares the movement vector with a prespecified threshold value and corrects the movement vector and also determines the validity of the movement vector.

More specifically, the direction computing section 11$a$ obtains a movement vector by computing an optical flow. The optical flow is obtained as a result of repeated computing, using a function indicating restricting conditions based on the assumption that velocity vectors adjacent to points in a moving object change smoothly, until the velocity vectors are converged to a balanced state. A method of obtaining an optical flow is disclosed, for instance, in the Japanese Patent Laid-Open Publication No. HEI 4-241077.

The direction correcting section 11$b$ processes the size of a movement vector according to a threshold value. When the size of the movement vector is larger than the threshold value it is determined that this movement vector is not valid and the movement vector is not outputted to the coordinate position updating section 11$c$. When the size of the movement vector is smaller than the threshold value it is determined that the movement vector is valid and the movement vector is outputted to the coordinate position updating section 11$c$.

The direction correcting section 11$b$ is provided to reduce, when a movement vector substantially changes according to a change in illuminating conditions, the influence of this change over a cursor display and to realize a smooth cursor display.

The coordinate position updating section 11c is a processing section for updating a coordinate position according to a valid movement vector received from the direction correcting section 11b. The display control section 11d is a device controller for displaying a cursor at a corresponding position on the display section 12 updated by the coordinate position updating section 11c.

The display section 12 is a display device comprising a display or a screen for displaying not only various types of data but also a cursor at a specified position, and a cursor on this display section 12 is controlled by the display control section 11d. Herein, description of displays other than that of a cursor is omitted herein for convenience of description, but various types of data can be displayed on the display section 12 by using the image processing device 11 or other types of device.

Figure 2B:
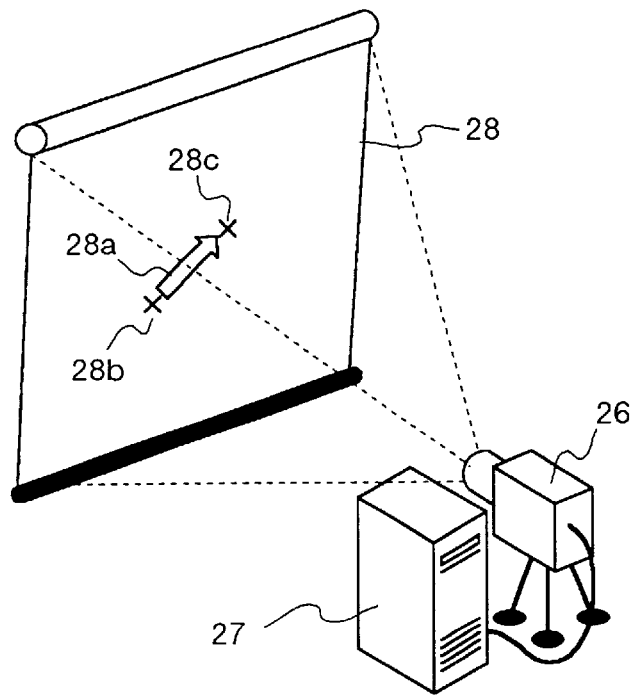

Next description is made for an example of environment for use of the coordinate position control system shown in FIG. 1. FIGS. 2A and 2B are views showing one example of environment for use of the coordinate position control system shown in FIG. 1. FIG. 2A shows the situation in which an operator 24 executes an operation for moving a pointing device 21 in the direction 25. In the case of FIG. 2A, an image of an area 23 is photographed by an image sensor 22 incorporated in the pointing device 21, and movement vectors included in the image are transmitted to an image processing device 27 shown in FIG. 2B.

As shown in FIG. 2B, the image processing device 27 receives the image transmitted by the pointing device 21 shown in FIG. 2A, calculates the movement vectors from the received image, determines the validity of the movement vectors, updates a coordinate position 28b of a cursor on a screen 28 to a coordinate position 28c in a direction 28a, and displays the cursor with a light projector 26 at the coordinate position 28c on the screen 28.

Figure 3A:
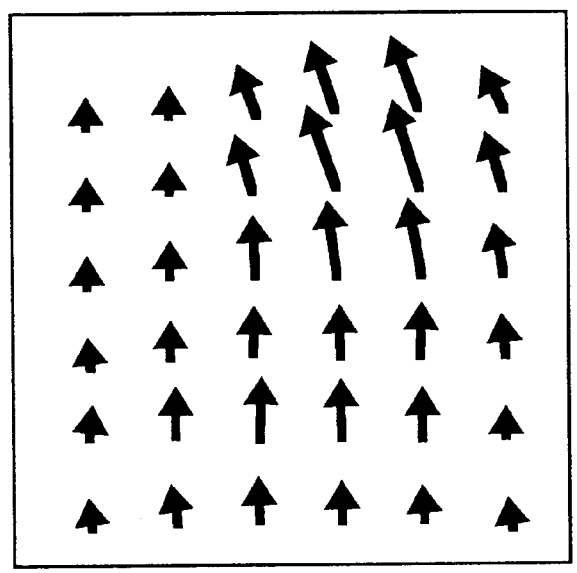
FIGS. 3A and 3B are views showing one example of an optical flow computed by the coordinate position control system as shown in FIG. 1 as well as of a movement vector.
Figure 3B:
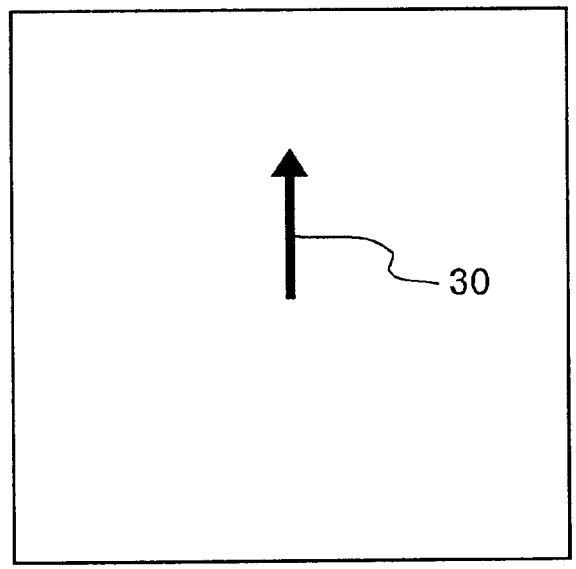

FIGS. 3A and 3B are views showing one example of an optical flow and movement vectors computed by the direction computing section 11a shown in FIG. 1. FIG. 3A is an optical flow showing the movements included in the area 23 whose image has been obtained by the pointing device 21. FIG. 3B shows an average (an average vector 30) of the movement vectors forming the optical flow above. In this embodiment, a movement vector is computed from an optical flow, but a movement vector can be obtained by means of correctional computing for the image.

Figure 4A:
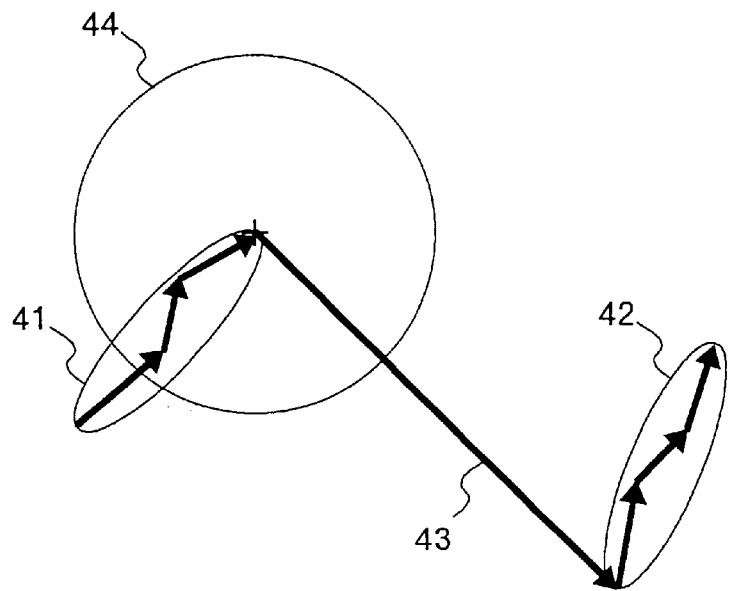
FIGS. 4A and 4B are explanatory views conceptually showing processing by a direction correcting section shown in FIG. 1.
Figure 4B:
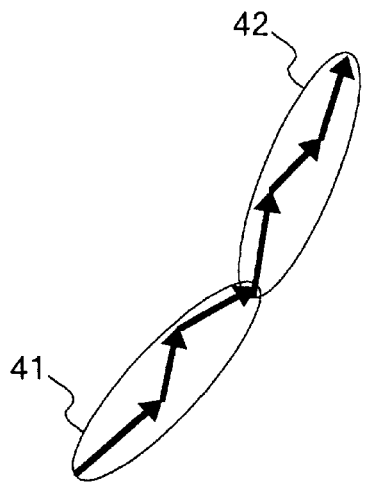

Description is made for a concept concerning determination of validity executed by the direction correcting section 11b shown in FIG. 1. FIG. 4A shows a trajectory of a cursor position when the processing using a threshold value according to the present invention is not executed, while FIG. 4B shows a trajectory of a cursor position when the processing using a threshold value according to the present invention is executed.

FIG. 4A shows the situation in which the direction computing section 11a computes a new vector 43 in response to acute change in the illuminating conditions within the photography area of the image sensor 10a in the pointing device 10 and an array of original vectors 41 is substantially different from the new array of vectors 42.

As described above, when the illuminating conditions in photography area of the image sensor 10a change acutely, a trajectory of a cursor is substantially disturbed, and a problem concerning operability of the pointing device 10 occurs. To overcome this problem, in the direction correcting section 11b shown in FIG. 1, a threshold value concerning a size of the movement vector as shown in a circle 44 in FIG. 4A is provided, and when the size of the movement vector exceeds the threshold value 44, the movement vector is determined as invalid. Thus, occurrence of an offset of the trajectory as shown in FIG. 4A is prevented, and a continuous trajectory as shown in FIG. 4B is obtained.

Figure 5:
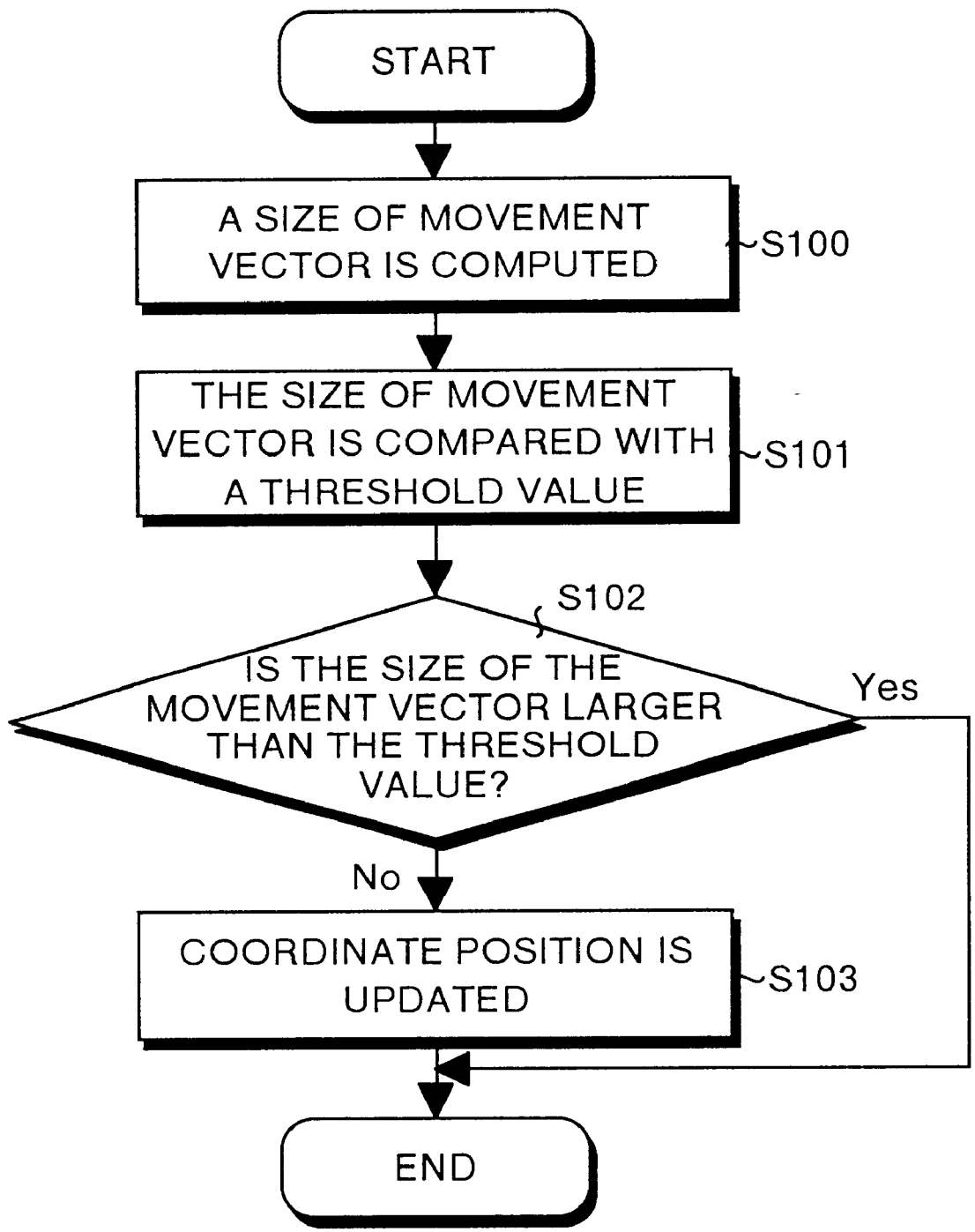
FIG. 5 is a flow chart showing a sequence of processing by the direction correcting section shown in FIG. 1.

Description is made hereinafter for a sequence of determination of validity of a movement vector by the direction correcting section 11b shown in FIG. 1. FIG. 5 is a flow chart showing a sequence of determination of validity of a movement vector by the direction correcting section 11b shown in FIG. 1.

As shown in the figure, when the direction computing section 11a computes a movement vector from the image photographed by the image sensor 10a in the pointing device 10, the direction correcting section 11b computes a size of this movement vector (step S100).

The size of the computed vector is compared with a prespecified threshold value as indicated by a circle 44 in FIG. 4A (step S101). When the size of the movement vector is smaller than the threshold value (step S102, negative), it is determined that this movement vector as valid and the movement vector is outputted to the coordinate position updating section 11c with a coordinate position of a cursor updated by the coordinate position updating section 11c (step S103).

In contrast, when the size of the movement vector is larger than the threshold value (step S102, affirmative), this movement vector is determined as invalid, and is not outputted to the coordinate position updating section 11c. Therefore, in this case, the coordinate position is not updated by the coordinate position updating section 11c.

As described above, in Embodiment 1, the direction computing section 11a computes a movement vector from an image captured up by the image sensor 10a, and when the computed movement vector is larger than a prespecified threshold value, the direction correcting section 11b determines the movement vector as invalid based on the recognition that the movement vector has acutely changed due to a change in the illuminating conditions or for some other reasons, so that offset of a cursor trajectory can be prevented with operability of a pointing device improved even when the illuminating conditions or other conditions change suddenly.

Description of Embodiment 1 above assumed a case where an optical flow is used for computing a movement vector from an image, but configuration of the present invention is not limited to this one, and a movement vector can be computed from other parameters. For instance, a movement vector can be computed by converting an image to projection data in the vertical and the horizontal direction, computing correlation between frames and computed movement vectors in the vertical and the horizontal direction. In addition, a movement vector in the vertical direction or in the horizontal direction can be computed by computing a one-dimensional optical flow from the projection data and obtaining an average vector thereof.

In the above description, when the size of the computed vector is larger than a prespecified value (for instance, th1), the direction correcting section 11b determines the movement vector as invalid and does not output the movement vector to the coordinate position updating section 11c. However, the configuration is allowable in which the direction correcting section 11b determined the movement vector as invalid and does not output the movement to the coordinate position updating section 11c when the movement vector is smaller than a threshold value (for instance, th2).

In other words, a situation is conceivable in which many small movement vectors are generated and a cursor position minutely changes due this movement vectors when illuminating conditions change, even if a user does not operate the pointing device 10 at all. To overcome this problem, a cursor fluctuation not intended by a user can be suppressed with the configuration in which, when a movement vector is smaller than a prespecified threshold value (th2), the movement vector is determined as invalid and is not outputted to the coordinate position updating section 11c.

In Embodiment 2 of the present invention, when a user extremely slowly operates the pointing device 10, a cursor can smoothly be moved by accumulating small movement vectors successively computed from image data and updating a coordinate position according to the accumulated movement vectors.

It should be noted that, also in Embodiment 2, the system configuration of the coordinate position control system is the same as that shown in FIG. 1 so that description thereof is omitted herein, and description is made centering on the processing for determining the validity by the direction correcting section 11.

The direction correcting section 11b used in this embodiment executes the processing for comparing a size of a movement vector with a prespecified threshold value like in Embodiment 1 described above, and when the size of the movement vector is smaller than a prespecified threshold value, the direction correcting section 11b computes an accumulated vector by successively adding and storing the movement vectors in a memory, and determines the accumulated movement vector as valid and outputs the accumulated movement vector to the coordinate position updating section 11c when the accumulated movement vector exceeds the threshold value.

Figure 6A:
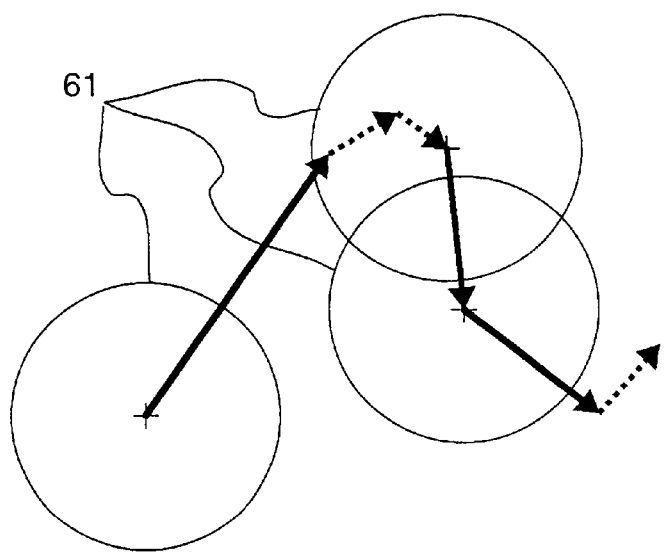
FIGS. 6A, 6B, and 6C are explanatory views showing a concept for a direction correcting section according to Embodiment 2 of the present invention.
Figure 6B:
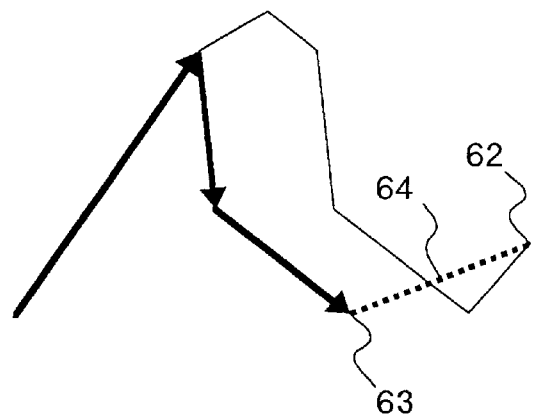
Figure 6C:
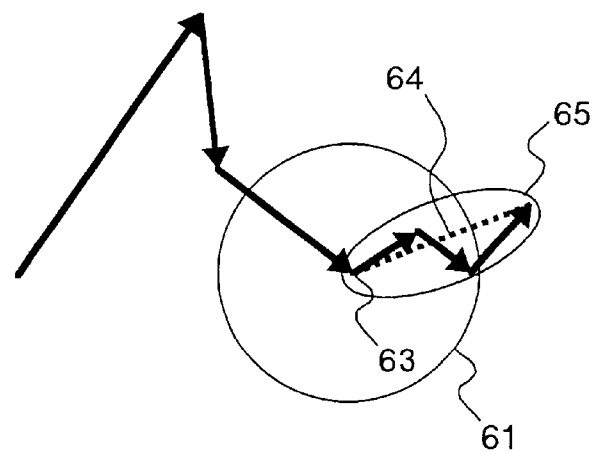

FIGS. 6A to 6C are explanatory views showing a concept for the processing by the direction correcting section 11b according to Embodiment 2. FIG. 6A shows a cursor trajectory when the processing with a threshold value as described above is not executed, and the solid line arrow in the figure is a movement vector having a size exceeding a threshold value 61, and a dotted line arrow in the figure is a movement vector having a size smaller than the threshold value 61.

As described above, if all the movement vectors are outputted to the coordinate position updating section 11c even when some of the movement vectors have a size smaller than a prespecified threshold value the movement of a cursor becomes very complicated.

In contrast, FIG. 6B is a view showing a result of processing in which a size of a movement vector is compared with the prespecified threshold value (circle 61) and a movement vector smaller than the threshold value is determined as invalid. In this case, in spite that a final cursor position should originally be positioned at an end point 62, the cursor is positioned at an end point 63 according to a result of the processing with a threshold value, the difference as indicated by a dotted line 64 is generated.

To overcome the problems as described above, the direction correcting section 11b according to this embodiment computes an accumulated movement vector by successively storing the movement vectors each determined as invalid in the processing with a threshold value and summing the movement values for the purpose to compensate the difference indicated by the dotted line 64 above, and, when this accumulated movement vector exceeds a threshold value, determines this accumulated movement vector as valid, and outputs the accumulated movement vector to the coordinate position updating section 11c.

FIG. 6C is a view showing an example of a result of the processing for correction in this embodiment. To compensate for the displacement 64 from the actual cursor movement generated in the processing with a threshold value, movement vectors each determined and discarded as invalid are summed up after the cursor is updated to the end point 63, and when the accumulated vector obtained through the processing above exceeds the threshold value 61, a coordinate position is updated according to this accumulated vector. Thus, a cursor position can be updated taking into account even the movement vectors each determined and discarded as invalid in the process of processing with a threshold value.

Especially in a case where, for instance, the pointing device 10 is always moved very slowly, even if movement vectors each smaller than a prespecified movement vector are discarded, displacement of a cursor position as described above occurs, and to overcome this problem, this embodiment, in which movement vectors each smaller than a threshold value are accumulated, is effective.

Figure 7:
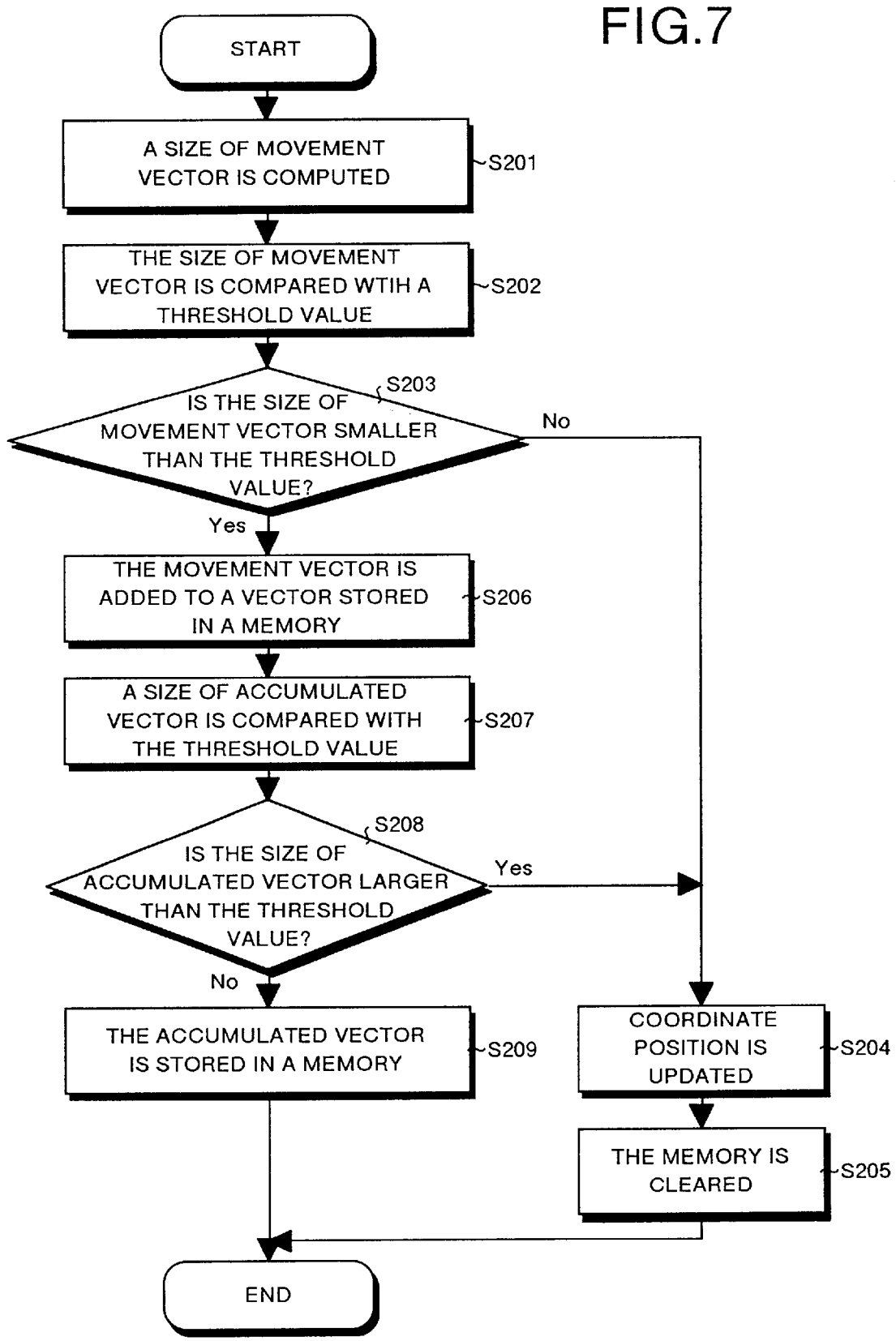
FIG. 7 is a flow chart showing a sequence of processing by the direction correcting section used in Embodiment 2.

Now description is made for a sequence of the processing by the direction correcting section 11b in Embodiment 2. FIG. 7 is a flow chart showing a sequence of the processing by the direction correcting section 11b used in Embodiment 2. As shown in this figure, when the direction computing section 11a computes a movement vector from an image photographed by the image sensor 10a in the pointing device 10, the direction correcting section 11b computes a size of this movement vector (step S201).

The size of the computed movement vector is compared with a prespecified threshold value (step S202), and when the size of this movement vector is larger than the threshold value (step S203, negative), the direction correcting section 11b determines this movement vector as valid, outputs the movement vector to the coordinate position updating section 11c with a coordinate position of the cursor updated by the coordinate position updating section 11c (step S204), and then the direction correcting section 11b clears a memory for storing accumulated movement vectors therein (step S205).

On the other hand, when the size of the movement vector is smaller than the threshold value (step 203, affirmative), this movement vector is determined as invalid and added to the accumulated movement vector stored in the memory (step S206), and the size of the resultant accumulated movement vector is compared with the threshold value (step S207).

As a result, when the size of the accumulated movement vector is smaller than the threshold value (step S208, negative) the accumulated vector is stored in the memory (step S209), and when the size of the accumulated movement vector exceeds the threshold value (step S208, affirmative), the direction correcting section 11b outputs the accumulated movement vector to the coordinate position updating section 11c, a coordinate position of the cursor is updated by this coordinate position updating section 11c (step S204), and the memory for storing accumulated movement vectors used by the direction correcting section 11b is cleared (step S205).

As described above, in this embodiment, vectors each discarded as a result of the processing with a threshold value for movement vectors computed from an image are successively summed up and the accumulated movement vector is reflected to updating of a cursor position, so that even substantially slow movement of a pointing device can be accommodated, which improves operability of the pointing device.

It should be noted that the configuration is allowable in which both the direction correcting section used in Embodiment 2 and that used in Embodiment 1 described above are provided, movement vectors each larger than a prespecified threshold value (th1) are excluded like in Embodiment 1, and the above-described processing is executed with another threshold value different from the threshold value above (th2)

In Embodiment 2, the direction correcting section 11b successively accumulates movement vectors that are smaller than a prespecified threshold value, but also can reduce an accumulated movement vector obtained for each frame. In Embodiment 3 described below, size of an accumulated movement vector can be attenuated in association with passage of time.

When the illuminating or other conditions are unstable, even when a user does not actually operate the pointing device 10, sometimes a change in the illuminating conditions may be computed as a movement vector. In this case also an accumulated vector is generated, so that the accumulated vector obtained through the processing with a threshold value for movement vectors described in Embodiment 2 is always reflected to updating of a cursor position, and because of this feature, a cursor frequently fluctuates.

To overcome this problem, in Embodiment 3, size of an accumulated vector is attenuated in association with passage of time to prevent the fluctuation of a cursor position due to a change in the illuminating conditions.

The system configuration in which an accumulated vector is attenuated in association with passage of time is the same as that shown in FIG. 1, and is different only in the point that the direction correcting section 11b attenuates an accumulated vector.

Figure 8A:
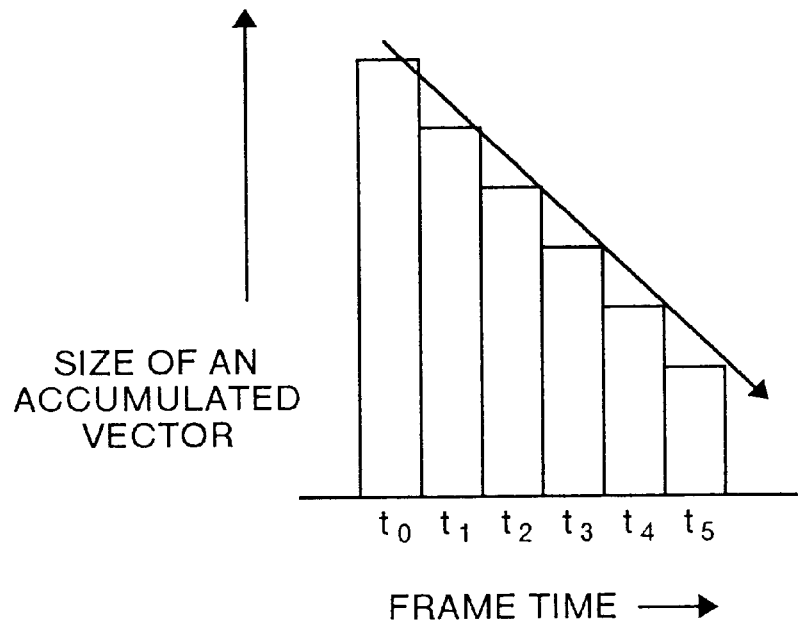
FIGS. 8A and 8B are views showing an example of an attenuation coefficient employed in a direction correcting section according to Embodiment 3 of the present invention.
Figure 8B:
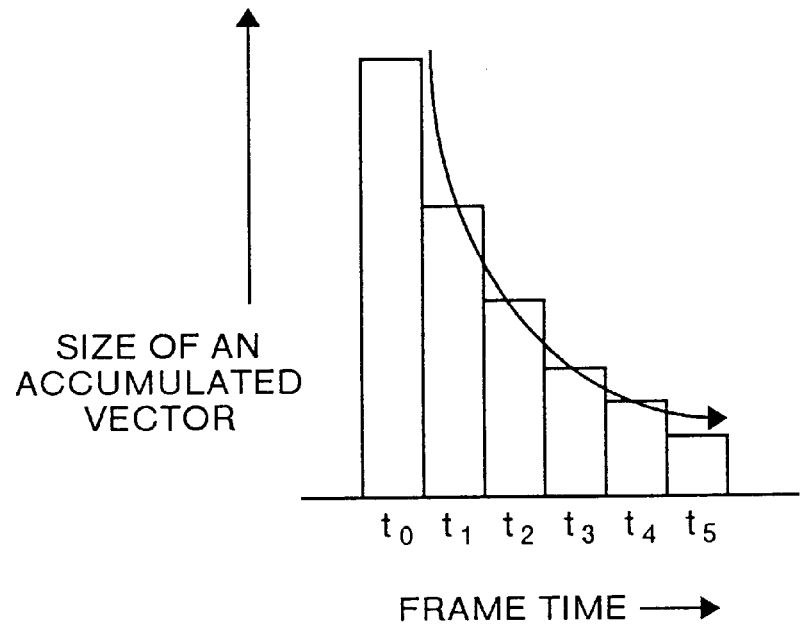

At first description is made for an attenuation coefficient used when the direction correcting section 11b according to Embodiment 3 executes the processing for attenuating an accumulated vector. FIGS. 8A and 8B are views showing one example of an attenuation coefficient used in the direction correcting section 11b according to Embodiment 3. This direction correcting section 11b can attenuate an accumulated vector with an attenuation coefficient for linearly reducing the size of the vector in association with passage of time as shown in FIG. 8A or with an attenuation coefficient for non-linearly reducing the size of the vector in association with passage of time as shown in FIG. 8B.

Figure 9:
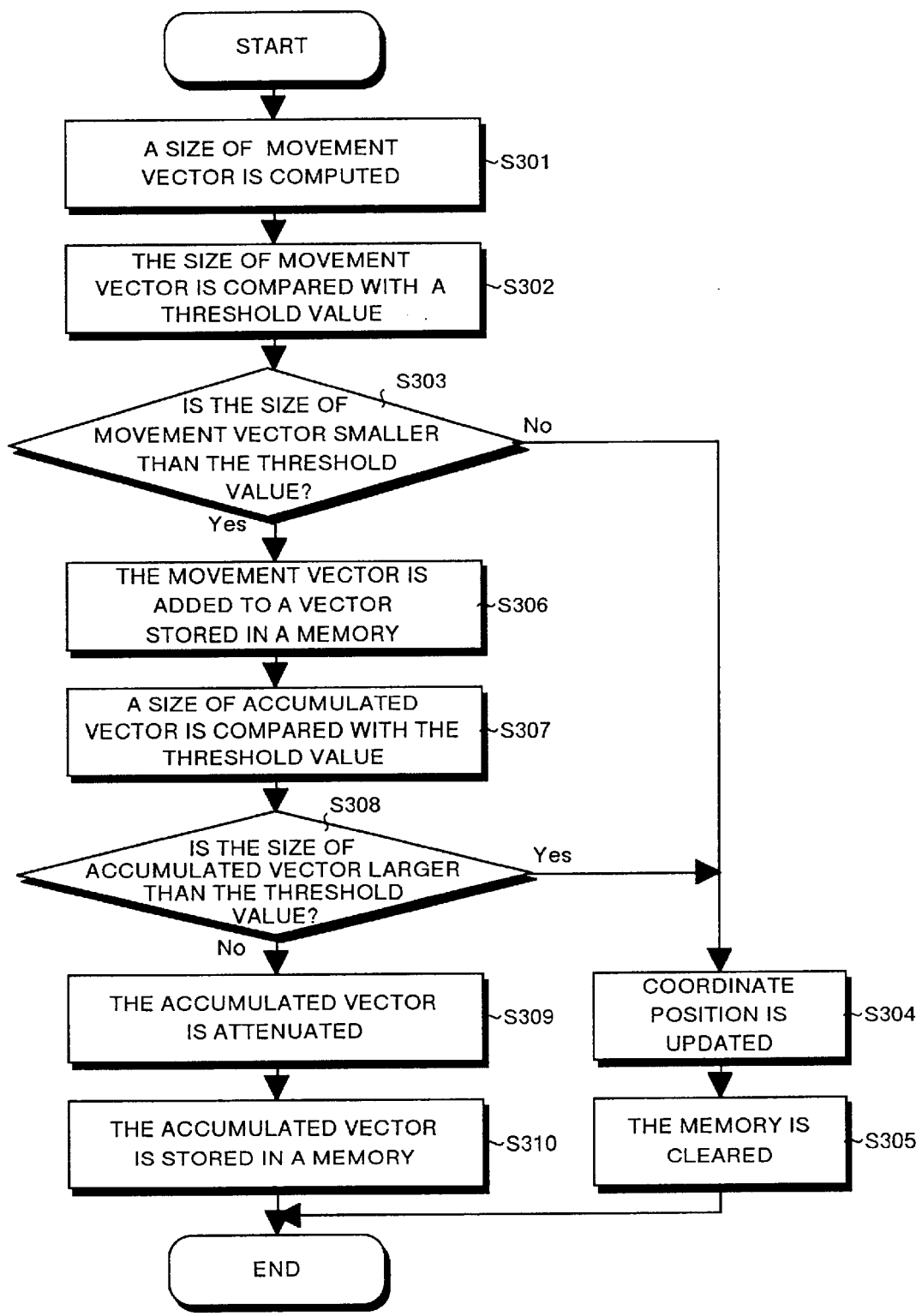
FIG. 9 is a flow chart showing a sequence of processing in the direction correcting section according to Embodiment 3.

A sequence of the processing by the direction correcting section 11b according to Embodiment 3 will be described. FIG. 9 is a flow chart showing a sequence of the processing by the direction correcting section 11b according to Embodiment 3. As shown in this figure, in the direction correcting section 11b, when the direction computing section 11a computes a movement vector, the size of the movement vector is computed (step S301)

The size of the movement vector is compared with a prespecified threshold value (step S302), and when the size of the movement vector is larger than the threshold value (step S303, negative), this movement vector is determined as valid and outputted to the coordinate position updating section 11c. The coordinate position updating section 11c updates a coordinate position of the cursor (step S304), and also the memory for storing accumulated vectors therein provided in the direction correcting section 11b is cleared (step S305).

On the other hand, when the size of the movement vector is smaller than the threshold value (step S303, affirmative), this movement vector is added to an accumulated vector stored in the memory (step S306), and the size of this new accumulated vector is compared with the threshold value (step S307).

As a result, when the size of this new accumulated vector is smaller than the threshold value (step S308, negative), the accumulated movement vector is attenuated with an attenuation coefficient for reducing the size of the accumulated movement vector linearly or non-linearly (step S309), and the attenuated accumulated vector is stored in the memory (step S310).

In contrast, when the size of the accumulated movement vector is larger than the threshold value (step S308, affirmative), the direction correcting section 11b outputs the movement vector to the coordinate position updating section 11c. The coordinate position updating section 11c updates a coordinate position of the cursor (step S304), and also clears the memory provided in the direction correcting section 11b (step S305).

As described above, in the direction correcting section 11b according to Embodiment 3, the processing by the direction correcting section 11b described in Embodiment 2 is combined with the processing for attenuating an accumulated vector shown in step S309.

Furthermore, a size of the accumulated vector described in Embodiment 2 above is attenuated, so that a cursor position can stably be updated even when the illuminating conditions are unstable, which improves operability of a pointing device.

Description of Embodiments 1 to 3 above assumes a case where validity of a movement vector is determined according to a size of the movement vector, but validity of a movement vector can also be determined according to a direction of a movement vector. In Embodiment 4 described below, validity of a movement vector is determined according to a direction of the movement vector.

In Embodiment 4, the system configuration is the same as that shown in FIG. 1, and only contents of processing by the direction correcting section 11b is different from that in Embodiment 1, so that description is made hereinafter only for a concept and a sequence of the processing with the direction correcting section 11b.

Figure 10A:
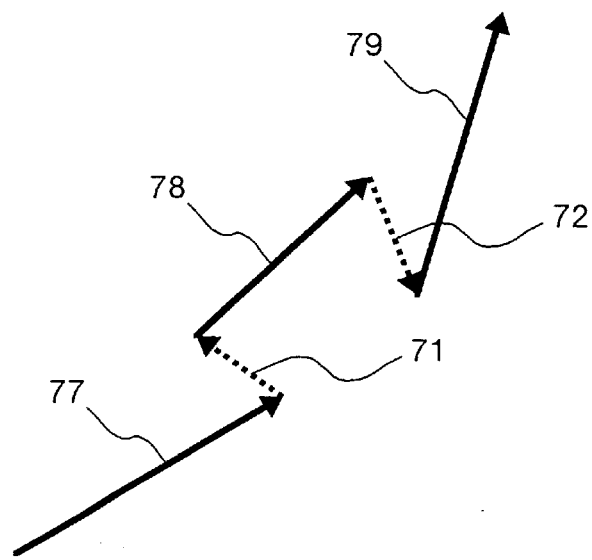
FIGS. 10A, 10B, and 10C are explanatory views showing a concept for processing by a direction correcting section according to Embodiment 4 of the present invention.
Figure 10B:
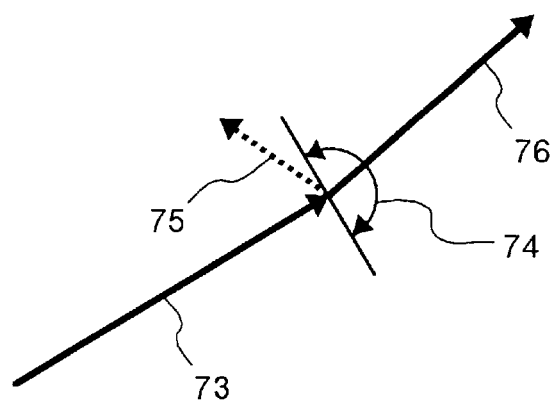
Figure 10C:
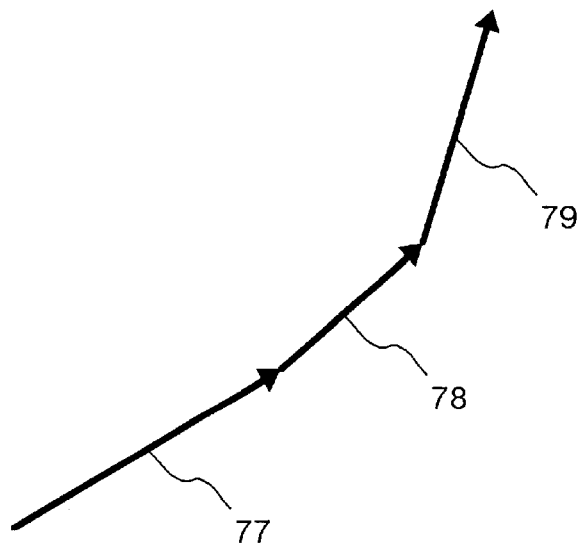

FIGS. 10A to 10C are views showing a concept of the processing by the direction correcting section 11b according to Embodiment 4. The direction correcting section 11b compares an angle between an immediately previous movement vector and the current movement vector with a prespecified value (an angular range), and determines the current movement vector as valid only when the angle between the two vectors is within the angular range.

More specifically, as shown in FIG. 10A, when the processing with a threshold value based on an angle as described above is not executed, movement vectors 71 and 72 as indicated by dotted lines in the figure can not be excluded, and sometimes a cursor movement different from that actually instructed with the pointing device 10 may be generated, which makes a trajectory indicating movement of a cursor unstable.

On the other hand, as shown in FIG. 10B, when the processing with a threshold value based on an angle according to this embodiment is executed, when an angle between the previous movement vector 73 and the current movement vector is within the angular range 74, the current movement vector is determined as valid, and when the angle is not within the angular range 74, the current movement vector is determined as invalid.

For instance, when the vector 75 indicated by a dotted line in the figure is the current movement vector, an angle between the previous movement vector 73 and the current movement vector 75 is out of the angular range 74, so that this movement vector 75 is determined as invalid. On the contrary, when a vector 76 in the figure is the current movement vector, as an angle between the previous movement vector 73 and the current movement vector 76 is within the angular range 74, this movement vector is determined as valid. Herein a case is shown in which this angular range 74 functioning as a threshold value is in a range from −90 degrees to +90 degrees.

FIG. 10C shows a result of processing when a threshold value based on an angular range is applied to the processing shown in FIG. 10A. The movement vectors 71 and 72 each indicated by a dotted line in FIG. 10A are determined as invalid and the movement vectors 77 to 79 are determined as valid, so that a trajectory of cursor movement is smooth.

Figure 11:
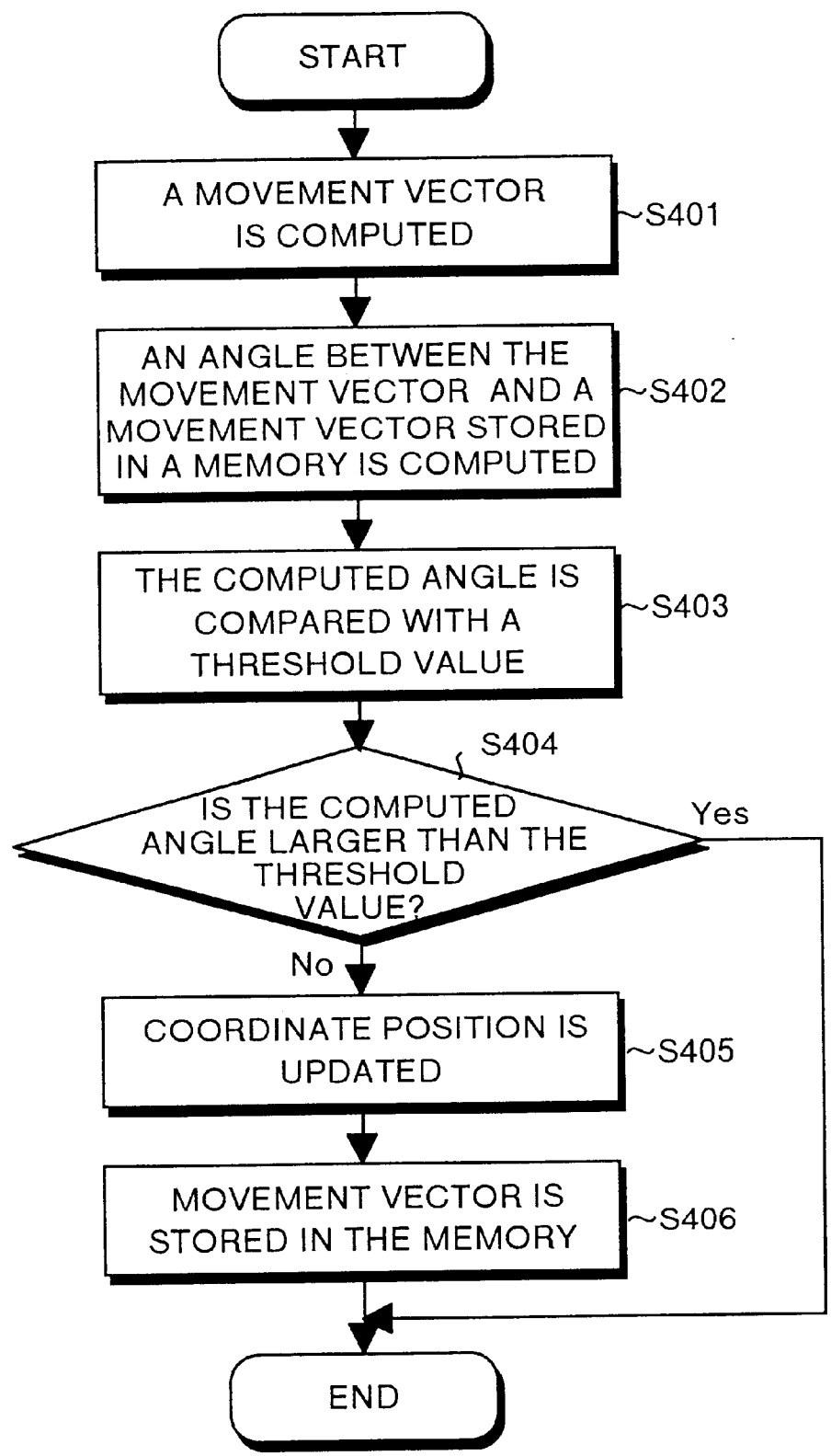
FIG. 11 is a flow chart showing a sequence of processing by the direction correcting section according to Embodiment 4.

Description is made hereinafter for a sequence of the processing by the direction correcting section 11b according to Embodiment 4. FIG. 11 is a flow chart showing a sequence of the processing by the direction correcting section 11b according to Embodiment 4. As shown in this figure, in the direction correcting section 11b, when the direction computing section 11a computes a movement vector (step S401), an angle between the current movement vector and a previous movement vector stored in the memory is computed (step S402), and the computed angle is compared with an angular range as a threshold value (step S403).

When the computed angle is smaller than the threshold value and within a prespecified angular range (step S404, negative), the current movement vector is determined as valid and outputted to the coordinate position updating section 11c. The coordinate position updating section 11c updates a coordinate position of a cursor according to this movement vector (step S405), and stores the movement vector as criteria for determination of validity of a subsequent vector (step S406).

On the other hand, when the computed angle is larger than the threshold value and not within the prespecified angular range (step S404, affirmative), the current vector is determined as invalid, and this movement vector is not outputted to the coordinate position updating section 11c.

As described above, in this embodiment, a threshold value (angular range) is provided for an angle between a previous movement vector and a current movement vector, and a movement vector not accommodated within this angular range is discarded as invalid, so that a curve such as a circle can smoothly be drawn with a trajectory of cursor movement.

Description of this embodiment above assumes a case where the threshold value for an angle between the two vectors is an angular range of 180 degrees from −90 degrees to +90 degrees, however the present invention is not limited to this configuration, and a narrower angular range or a wider angular range may be used as a threshold value.

As described above, with the present invention, a movement vector from an image photographed with an image capturing section in a coordinate position instructing device is computed, the computed movement vector is compared with a prespecified threshold value, validity of the movement vector is determined according to a result of comparison, and an instructed coordinate position responding to an operation of the coordinate position instructing device is updated according to a movement vector determined as valid. Therefore, there is provided the advantage that disturbance in a trajectory when a cursor position is controlled is attenuated and operability of the coordinate position instructing device can be improved.

With the present invention, a size of a computed movement vector is compared with a prespecified threshold value, and when the size of the movement vector is larger than the prespecified threshold value the movement vector is determined as valid. Therefore, there is provided the advantage that disturbance of a cursor trajectory can be attenuated even when the illuminating or the other conditions change abruptly and operability of the coordinate position instructing device can be improved.

With the present invention, a size of the computed movement vector is compared with a prespecified threshold value, and when the size of the movement vector is smaller than a prespecified threshold value the movement vector is determined as invalid. Therefore, there is provided the advantage that fluctuation of a cursor position due to a change in the for illuminating or for others conditions not intended by an operator can be suppressed by excluding movement vectors minutely changing according to conditions for illumination or for others.

With the present invention, an accumulated vector is obtained by successively adding the movement vectors which are smaller than a prespecified threshold value, and when the accumulated vector exceeds a prespecified threshold value this accumulated vector is determined as valid. Thus, by adding the movement vectors to get one accumulated vector, there is provided the advantage that, even if the image changes at a low speed due to a slow operation, it is possible to smoothly move a cursor position in response to a series of operations of a coordinated position instructing device by differentiating the changes caused by the slow operations from fluctuation caused by changes in illuminating conditions.

With the present invention, an accumulated vector is attenuated according to a prespecified attenuation coefficient in association with passage. Therefore, there is provided the advantage that fluctuation of a cursor position caused by noises when movement vectors are accumulated under unstable illuminating conditions can be reduced and operability of the coordinate position instructing device can further be improved.

With the present invention, an angle between a movement vector to be determined and a movement vector determined as valid just before is compared with a prespecified angular range, and when the angle between the two vectors is not within the prespecified angular range, the movement vector is determined as invalid; whereby there is provided the advantage that movement vectors each containing acute change of an angle are excluded and a curve such as a circle can be drawn smoothly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinate position control system comprising:
   a coordinate position instructing device having an image capturing section; and
   a coordinate position control device for controlling an instructed coordinate position responding to operation of said coordinate position instructing device and having
      a computing unit for computing size of a movement vector from successive images photographed by said image capturing section;

a determining unit for determining that a movement vector is invalid when the size of the movement vector computed by said computing unit is smaller than a size threshold; and an updating unit for updating an instructed coordinate position responding to operation of said coordinate position instructing device according to a movement vector determined as valid by said determining unit.

2. The coordinate position control system according to claim 1 wherein said determining unit computes an accumulated vector by successively adding the movement vectors that are smaller than the size threshold, and determines that the accumulated vector is valid when the accumulated vector exceeds an accumulation threshold.

3. The coordinate position control system according to claim 2 wherein said determining unit attenuates the accumulated vector in response to passage of a period of time according to an attenuation coefficient.

4. The coordinate position control system according to claim 1 wherein said computing unit computes an angle between a movement vector and a movement vector previously determined as valid, and said determining unit compares the angle with a threshold angle and determines that the movement vector is not valid when the angle is not within an angular range.

5. A method of controlling an instructed coordinate position in response to operation of a coordinate position instructing device according to a movement vector obtained from successively images photographed with an image capturing section in the coordinate position instructing device, the method comprising:

computing size of a movement vector from successive images photographed with the image capturing section;

comparing the size of the movement vector with a size threshold and determining that the movement vector is invalid when the size of the movement vector is smaller than the size threshold; and updating an instructed coordinate position responding to operation of the coordinate position instructing device according to a movement vector determined as valid.

6. The method according to claim 5 including computing an accumulated vector by successively adding the movement vectors that are smaller than the size threshold, and determining the accumulated vector as valid when the size of the accumulated vector exceeds an accumulation threshold value.

7. The method according to claim 6 including attenuating the accumulated vector in response to passage of a period of time according to an attenuation coefficient.

8. The method according to claim 5 including computing an angle between a movement vector and a movement vector previously determined as valid, comparing the angle with an angular range, and determining the movement vector as invalid when the angle, is not within the angular range.

* * * * *